United States Patent [19]

Berg

[11] Patent Number: 4,950,972

[45] Date of Patent: Aug. 21, 1990

[54] ALTERNATOR SYSTEM FOR AUTOMOTIVE VEHICLES

[75] Inventor: Peter G. Berg, Attleboro Falls, Mass.

[73] Assignee: Texas Instruments Incorporated, Dallas, Tex.

[21] Appl. No.: 284,207

[22] Filed: Dec. 14, 1988

[51] Int. Cl.[5] .................................................. H02J 7/14
[52] U.S. Cl. .......................................... 322/8; 322/90; 219/202
[58] Field of Search ............................ 322/7, 8, 28, 90; 320/64; 219/202, 203; 307/16

[56] References Cited

U.S. PATENT DOCUMENTS

| | | | |
|---|---|---|---|
| 4,045,718 | 8/1977 | Gray | 320/64 X |
| 4,084,126 | 4/1978 | Clements | 322/8 |
| 4,239,978 | 12/1980 | Kofink | 307/16 |
| 4,262,242 | 4/1981 | Glennon | 307/16 X |
| 4,267,433 | 5/1981 | Sahm, III | 322/8 X |
| 4,678,982 | 7/1987 | Offiler et al. | 322/8 |
| 4,692,684 | 9/1987 | Schaeffer | 322/90 |
| 4,694,238 | 9/1987 | Norton | 322/28 |
| 4,730,097 | 3/1988 | Campbell et al. | 322/7 X |

Primary Examiner—Steven L. Stephan
Assistant Examiner—Kristine Peckman
Attorney, Agent, or Firm—John A. Haug; James P. McAndrews; Melvin Sharp

[57] ABSTRACT

An automatic alternator is coupled to both a step up and a step down transformer. The outputs from the transformer are rectified and connected respectively to a windshield heater and to a circuit comprising the normal 14 volt car loads and the battery. A switch is coupled to the output of the step up transformer to control the energization of the windshield heater. Output leads from the alternator also bypass the transformer and are rectified with its DC output connected through switched to a positive temperature coefficient of resistivity heater and to the normal car load circuit.

10 Claims, 2 Drawing Sheets

ALTERNATOR SYSTEM FOR AUTOMOTIVE VEHICLES

The present application relates generally to automotive alternator systems and more particularly to such systems adapted for use with loads having high power requirements.

In U.S. Pat. No. 4,678,982, assigned to the assignee of the present invention, a transformer is coupled to the stator windings of an alternator of a vehicle so that the voltage regulator forces the alternator to operate at an elevated voltage thereby realizing greater output power from the alternator. The high voltage power is tapped off intermediate the stator windings and the transformer and is used to energize an electric heater to supplement the main heater of the vehicle while at the same time providing normal 14 volt power to the normal electrical loads such as lights, radio and the like.

However, a system made in accordance with the above referenced patent is subject to a potential limitation. That is, in the event of a failure of the relays switching the transformer into and out of the system connection of the alternator to the system could be interrupted resulting in reliance on the battery to provide power for the normal electrical loads. If not promptly corrected this would result in excessive draining of the battery. It is an object of this invention to provide an improved automotive alternator system in order to supply power for a windshield heater as well as a supplemental compartment heater in addition to the normal 14 volt car loads. Another object is the provision of an alternator system which provides high power for heating devices which is relatively inexpensive yet extremely reliable and which does not interfere with the normal operation of the vehicle.

Briefly, in accordance with the invention, a step up and step down transformer is coupled to the stator windings of the alternator of the vehicle so that the voltage regulator forces the alternator to operate at an elevated voltage, in at least certain selected modes of operation, to realize greater output from the alternator.

According to a feature of the invention three levels of voltage are provided to energize the normal 14 volt car loads, a high power windshield heater (e.g. 75 volts) and a supplemental compartment heater (e.g. a 32 volt PTC heater).

According to another feature of the invention one of the operational modes of the system provides a low power supply (e.g. 32 volts) for a keep warm function of a 75 volt heater.

According to yet another feature of the invention a fail safe feature is provided to ensure that, even with switch malfunction, in switching to the various selected modes of operation that the 14 volt supply to the normal car loads is continued.

BRIEF DESCRIPTION OF THE DRAWINGS

Other objects, features, advantages and details of the alternator system provided by this invention appear in the following detailed description of the preferred embodiment of the invention, the detailed description referring to the drawings in which.

Figure 1:
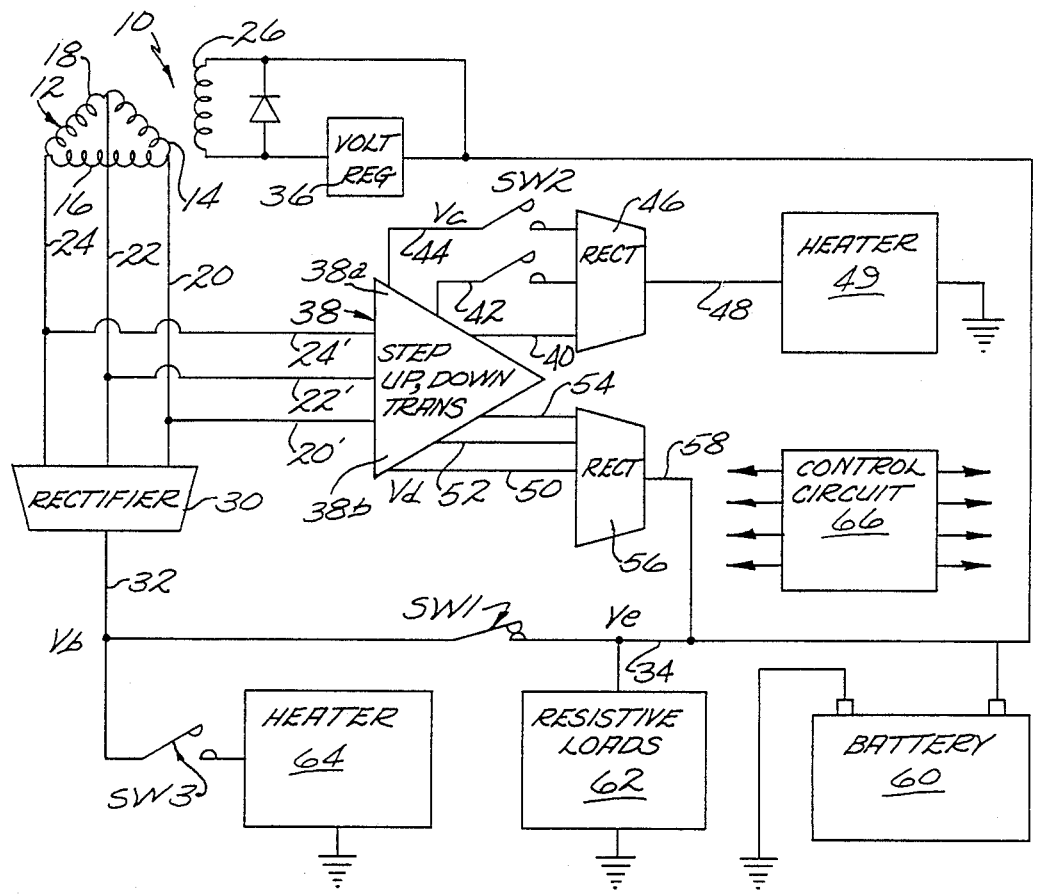
FIG. 1 is a schematic diagram showing an alternator system as used with normal car loads, a PTC supplemental car heater and a windshield heater.

Referring to the drawings, numeral 10 refers generally to the alternator system made in accordance with the preferred embodiment of the present invention. A conventional automotive alternator 12 has three delta connected stator windings 14, 16, 18 with output line 20 connected between windings 14, 16, output line 22 connected between windings 14, 18 and output line 24 connected between windings 16, 18. A field winding 26, adapted to be rotated by the vehicle's engine, is disposed adjacent to the stator windings in a known manner so that direct current caused to flow through field winding 26 upon rotation thereof will generate current in the stator windings. Lines 20, 22, 24 are connected to a first rectifier 30 which has an output line 32 connected through a first switch SW1 to line 34 which is coupled to regulator 36. Output lines 20, 22, 24 are also connected respectively to lines 20', 22', 24' which are coupled to a step up and step down transformer 38 having step up portion 38a and step down portion 38b. It will be understood that if desired separate step up and step down transformers would be used rather than the combined unit indicated in the Figure. As shown, step up portion 38a has output lines 40, 42, 44 coupled to a second rectifier 46 through a switch SW2. Switch SW2 is shown in two output lines 42, 44 although it could be provided in all three lines if desired. Further, if desired, the switch could be placed in the DC output 48. Output 48 is connected to a resistive windshield heater, for example a 75 volt DC heater 49.

Step down portion 38b has output lines 50, 52, 54 connected to a third rectifier 56 which has a DC output line 58 connected to line 34. Line 34 is connected to battery 60 and normal resistive car loads 62.

DC output line 32, from rectifier 30, is also connected, through switch SW3, to an electrical resistance heater 64, preferably a self regulating positive temperature coefficient (PTC) of resistivity heater which serves as a supplemental compartment heater. For example, a suitable heater is shown and described in U.S. Pat. No. 4,264,888 and comprises a ceramic material such as lanthanum doped barium titanate or the like in which the material is adapted to display a sharp, anomalous increase in resistivity when heated to a preselected temperature. The heater is formed with a plurality of parallely extending passages through which air to be heated is directed. If desired, a control circuit 66 can be employed with the system to accept appropriate inputs, such as manual start switch, water temperature and so on and provide appropriate outputs such as idle speed control, fan speed control, switch SW1, SW2 and SW3 on-off switching.

The above system provides a number of opertional modes depending on the switch positions which are illustrated in the following Table 1.

TABLE 1

| OPERATION MODES | SWITCHES | | | VOLTAGES | | | | | REC | | |
| --- | --- | --- | --- | --- | --- | --- | --- | --- | --- | --- | --- |
| | 1 | 2 | 3 | Va | Vb | Vc | Vd | Ve | 1 | 2 | 3 |
| FULL POWER TO THE HEATED WINDSHIELD | O | C | O | 3 PH 32 V | VDC 32 V | 3 PH 75 V | 3 PH 14 V | VDC 14 V | OFF | ON | ON |
| FULL POWER TO THE PTC CAR HEATER | O | O | C | 3 PH 32 V | VDC 32 V | 3 PH 75 V | 3 PH 14 V | VDC 14 V | ON | OFF | ON |
| LOW POWER TO THE HEATED WINDSHIELD | C | C | O | 3 PH 14 V | VDC 14 V | 3 PH 32 V | 3 PH 6 V | VDC 14 V | ON | ON | OFF |
| NORMAL VEHICLE OPERATION AT 14 VDC | C | O | O | 3 PH 14 V | VDC 14 V | 3 PH 32 V | 3 PH 6 V | VDC 14 V | ON | OFF | OFF |

Figure 2:
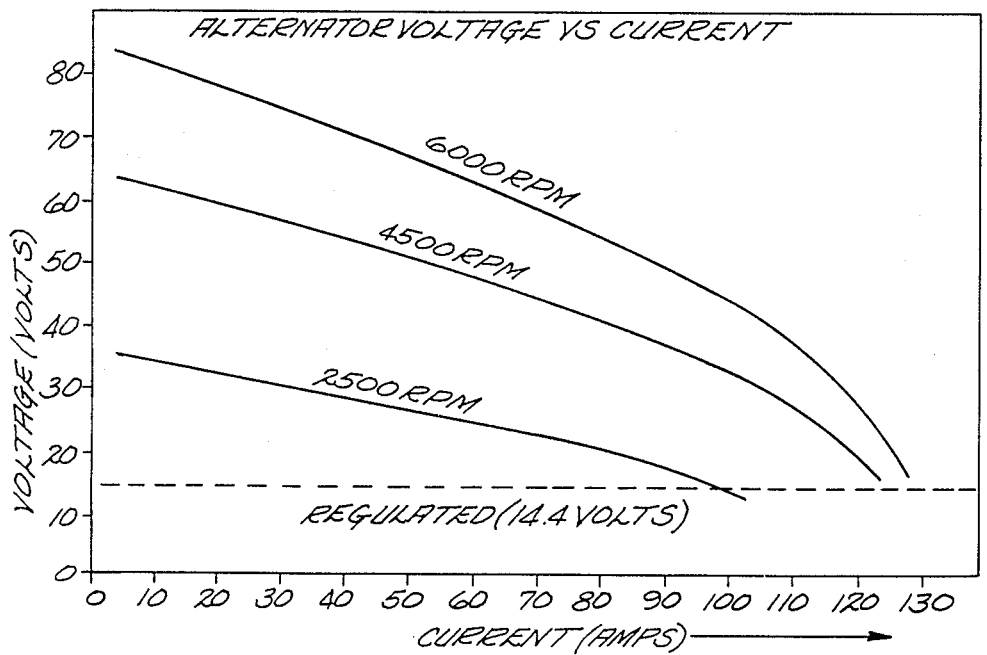
FIG. 2 is a graph showing voltage versus current for several alternator speeds of a typical automotive alternator.
Figure 3:
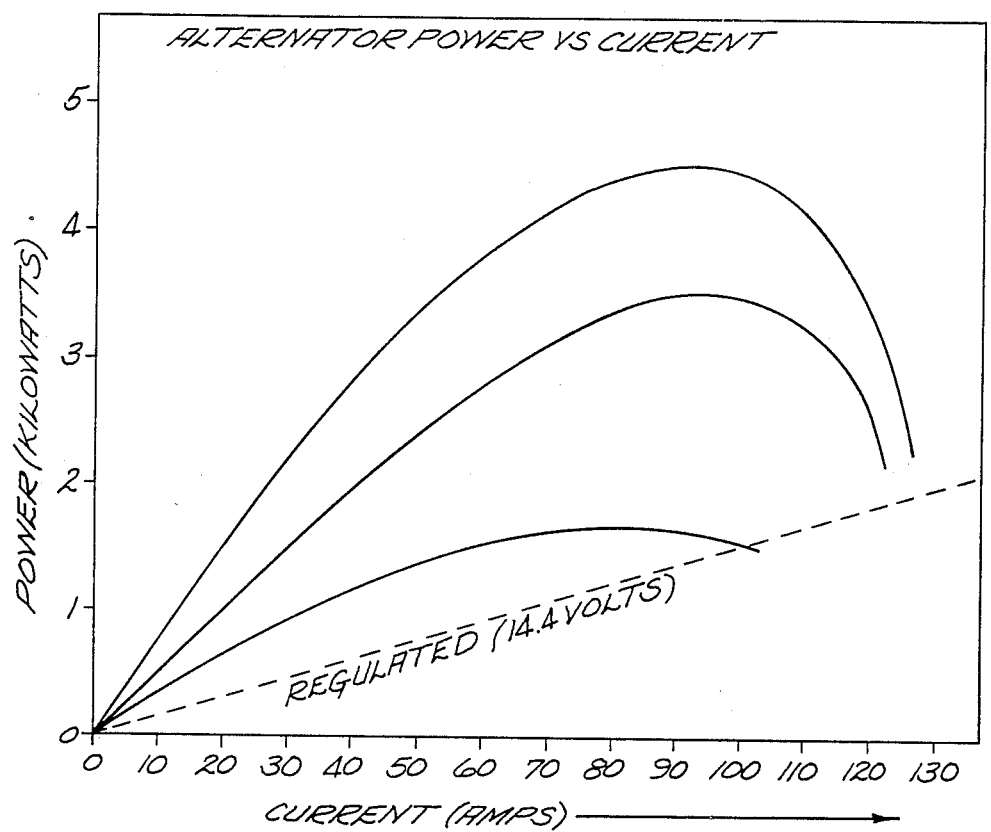
FIG. 3 is a graph showing power versus current for the same alternator speeds and the same altrnator as that used for FIG. 2.

The above values are based on a 2.3 to 1 step up a 2.3 to 1 step down transformer 38 and are approximated rectified DC equivalent value. For example, where 3PH 32 V is indicated in the table it implies 3 phase AC voltage approximately equivalent to 32 VDC after rectification. It should be noted that values of transformer ratios, voltages and the like may be optimized as desired. With switch SW1 open the 14 VDC voltage to the car loads is provided through the 2.3 to 1 step down transformer 38b and rectifier 56. This means that with switch SW1 open, alternator 12 will operate at 32 volts in the high power output of its voltage current curves (FIG. 2). In this mode, higher power can be provided to the windshield heater 49 (e.g. at 75 volts) or the PTC supplemental heater 64 (e.g. at 32 volts) as long as alternator speed is high enough.

When switch SW1 is closed, alternator 12 will operate normally at 14 volt nominal output. Under this condition, a keep-warm (lower power to the windshield heater 49) feature is provided in which the 14 volts is stepped up to 32 volts by closing switch SW2 while switch SW1 is closed. When switch SW1 is closed, step down transformer 38b provides such a low voltage (e.g. 6 VAC 3 phase) to rectifier 56 as to shut it off with all 14 volt power to the car loads coming through rectifier 30.

Switches SW1, SW2 and SW3 can be relays driven by commands from control circuit 66 and can be switched under no load conditions through a command sequence that turns off the alternator field voltage 26 momentarily. Control circuit 66, as mentioned above can accept various inputs including manual start switch, water temperature and so on and provide appropriate outputs including idle speed control, fan speed control, on-off switching of switches SW1, SW2, SW3.

A system made in accordance with the invention can provide 2000 watts to the compartment and/or windshield heater while providing 1000 watts to 14 DC car loads as long as the alternator RPM is maintained. Advantageously, failure of switch SW1 open or close still allows normal 14 volt supply to the car loads thereby avoiding draining of the battery, again as long as suitable alternator speed in maintained.

Although the heaters 49 and 64 are shown connected to ground, it will be understood that, if desired, they could have a positive and negative DC hook up using a two wire input. Further it will be realized that appropriate capacitive protection would be provided for the several components shown in the circuit.

It should be understood that although the preferred embodiment of the novel and improved alternator system has been described in detail for illustrating the invention, it is the intention to include all modifications and equivalents of the described embodiment falling within the scope of the appended claim.

What is claimed is:

1. An alternator system for an automotive vehicle having an engine and a plurality of electrical loads, an alternator having a field winding drivable by an engine to provide electrical power for a plurality of electrical loads, a voltage regulator for controlling the field winding energization, a battery for supplementing the electrical power provided by the alternator where needed and for turning over the engine upon start up, the alternator having a stator with three stator windings, the stator windings coupled together to provide a three phase output on three output lines, the output lines connected to a first rectifier which has a DC output line connected to a circuit including the plurality of electrical loads and the battery through a first switch, the three output lines also coupled to a step up transformer and a step down transformer, the output of the step up transformer connected to a second rectifier through a second switch to turn on and off the output of the step up transformer, the output of the second rectifier coupled to a windshield heater, the output of the step down transformer connected to a third rectifier whose output in turn is connected to the electrical loads, the third rectifier will turn off if the output of the step down transformer is below a selected minimum value, the DC output line also connected to an electrical resistance heater through a third switch, the voltage regulator controlling the level of energization of the alternator field winding in order to provide a selected voltage level in the circuit.

2. An automotive vehicle according to claim 1 in which the regulator controls the alternator to provide through the step down transformer approximately 14 volts in the circuit including the plurality of electrical loads and the step up transformer provides the equivalent of approximately 75 volts DC when the first switch is open.

3. An automotive vehicle according to claim 1 in which the regulator controls the alternator to provide approximately 14 volts in the circuit including the plurality of electrical loads through the first rectifier when the first switch is closed and the step down transformer provides less than the selected minimum value.

4. An automotive vehicle according to claim 1 in which the regulator controls the alternator to provide approximately 14 volts in the circuit including the plurality of electrical loads through the first rectifier when the first and second switches are closed and the third switch is open and the step down transformer provides less than the selected minimum value and the step up transformer provides the equivalent of approximately 32 volts DC.

5. An automotive vehicle according to claim 4 in which the windshield heater is rated at approximately 75 volts DC.

6. An automotive vehicle according to claim 1 in which full power is applied to the windshield heater when the first and third switches are open and the second switch is closed.

7. An automotive vehicle according to claim 1 in which full power is applied to the electric resistance heater when the first and second switches are open and the third switch is closed.

8. An automotive vehicle according to claim 1 in which low power is applied to the windshield heater when the first and second switches are closed and the third switch is open.

9. An automotive vehicle according to claim 1 in which no power is applied to the windshield heater and the electric resistance heater and normal regulator voltage is applied to the electrical loads when the first switch is closed and the second and third switches are open.

10. An automotive vehicle having an engine and a plurality of electrical loads, an alterntor having a field winding driven by the engine to provide electrical power for such loads, a voltage regulator for controlling the field winding energization, a battery for supplementing the electrical power provided by the alternator where needed and for turning over the engine upon start up, the alternator having a stator with at least three stator windings, the stator windings coupled together to provide a polyphase output on AC output lines, the AC output lines connected to a first rectifier which has a DC output line connected to a circuit including the plurality of electrical loads and the battery through a first switch, the DC output line also connected to an electrical resistance heater through another switch, the AC output lines also coupled to a step down transformer, the output of the step down transformer connected to another rectifier whose output in turn is connected to the electrical loads, the said another rectifier will turn off if the output of the step down transformer is below a selected minimum value, the voltage regulator controlling the level of energization of the alternator field winding in order to provide a selected voltage level in the circuit including the plurality of electrical loads.

* * * * *